UNITED STATES PATENT OFFICE.

JOSEPH W. RICHARDS, OF PHILADELPHIA, PENNSYLVANIA.

SOLDER FOR ALUMINIUM.

SPECIFICATION forming part of Letters Patent No. 478,238, dated July 5, 1892.

Application filed October 5, 1891. Serial No. 407,789. (No specimens.)

*To all whom it may concern:*

Be it known that I, JOSEPH W. RICHARDS, of the city of Philadelphia and State of Pennsylvania, have invented a certain new and useful Solder for Aluminium Surfaces, whereof the following is a specification.

Heretofore much difficulty has been experienced in soldering aluminium surfaces to one another or to other metals, owing to the fact that with the solders heretofore used a film of oxide persistently forms with such rapidity that the solvents or fluxes used fail to thoroughly eliminate it. Even though the film of oxide is exceedingly thin, in fact imperceptible to the eye, it prevents the perfect union of the solder with the metal, and hence impairs the closeness and strength of the joint. I have found that by diffusing throughout the solder itself a deoxidizing or reducing reagent of the proper character, and thus subjecting the aluminium surface to the action of such reagent during the period of actual contact with the melted solder deoxidation can be effected as a part of the act of soldering, and hence no opportunity is afforded for the formation of a new film of oxide. The deoxidizing or reducing agent should be one which under the conditions of use has a greater affinity for oxygen than is possessed by the other ingredients of the solder and whose oxide is not liable to form a film or otherwise interfere with the integrity of the soldered joint. The reagent which I have found most desirable for this purpose is phosphorus, which when present in a proper solder, even as a minute percentage, suffices to effect the reduction of the oxide in the manner above indicated. The compound which I have found best adapted to act, both as a vehicle for the reducing agent and as a solder also, is an alloy of aluminium, zinc, and phosphor-tin, and I prefer to prepare the same as follows:

I melt one part (by weight) of metallic aluminium in a suitable crucible and then add thereto eight parts of zinc. In a separate crucible I melt thirty two parts of tin and add to it one part of five per cent. (5%) phosphor-tin, thus diluting the phosphor-tin, so as to reduce the percentage of phosphorus therein. I then pour the diluted phosphor-tin into the melted alloy of zinc and aluminium, stir well, and as soon as the compound is homogeneous I pour it into suitable small bars for use.

The proportions above given are those which I have found most suitable for general use, either with a blowpipe or an ordinary soldering-iron; but they may be varied with the following results—viz., an increased percentage of tin will give a lower melting point while an increased percentage of aluminium and zinc will make a stronger solder.

While I have given the above formula as indicating the best embodiment of my invention known to me, I do not limit myself to the use of phosphorus or phosphor-tin; nor in the case of these ingredients for the solder do I limit its composition to the precise proportions above mentioned, since it will possess the qualities which make it specifically useful in this connection whenever the deoxidizing reagent is present in sufficient quantity to deoxidize the surface during the soldering, even though the proportions of the other ingredients be varied. Furthermore, the above-described method of preparing the solder is not to be understood as essential, but is simply indicated as convenient, because the five per cent. phosphor-tin is readily obtainable in the market and is easily diluted in the manner specified.

Having thus described my invention, I claim—

1. As a solder for aluminium, an alloy of aluminium and zinc, having incorporated therein a reducing reagent whose affinity for oxygen is greater than that of aluminium or zinc under the conditions of use and whose oxide is substantially non-film-forming.

2. As a solder for aluminium, an alloy of aluminium, zinc, and phosphor-tin, substantially as set forth.

JOSEPH W. RICHARDS.

Witnesses:
 HENRY N. PAUL, Jr.,
 E. REESE.